(12) United States Patent
Brinton, Jr.

(10) Patent No.: US 8,617,280 B2
(45) Date of Patent: Dec. 31, 2013

(54) COMPOSITIONS AND METHODS FOR BUFFERED GROWING MEDIA

(75) Inventor: William F. Brinton, Jr., Mount Vernon, ME (US)

(73) Assignee: Woods End Laboratories, Inc., Mount Vernon, MA (US)

( * ) Notice: Subject to any disclaimer, the term of this patent is extended or adjusted under 35 U.S.C. 154(b) by 249 days.

(21) Appl. No.: 12/856,211

(22) Filed: Aug. 13, 2010

(65) Prior Publication Data

US 2012/0036907 A1    Feb. 16, 2012

(51) Int. Cl.

| C05F 3/00 | (2006.01) |
|---|---|
| C05F 11/00 | (2006.01) |
| C05F 11/02 | (2006.01) |
| C05F 17/00 | (2006.01) |
| G01N 31/00 | (2006.01) |

(52) U.S. Cl.
USPC .................. 71/9; 71/11; 71/21; 71/23; 71/24; 436/2

(58) Field of Classification Search
USPC .................. 71/8, 9, 10, 11, 21, 23, 24; 436/2
See application file for complete search history.

(56) References Cited

U.S. PATENT DOCUMENTS

| 2,592,711 | A | * | 4/1952 | Knaust et al. ..................... 71/5 |
|---|---|---|---|---|
| 3,640,696 | A | * | 2/1972 | Goldmann ........................ 71/9 |
| 3,761,237 | A | * | 9/1973 | Jeffreys ........................... 71/9 |
| 3,837,810 | A | * | 9/1974 | Richards et al. ............ 422/209 |
| 4,233,266 | A | * | 11/1980 | Kummer .................. 435/290.1 |
| 4,767,440 | A | * | 8/1988 | Salac ............................... 71/23 |
| 4,900,348 | A | * | 2/1990 | Hoitink ............................ 71/6 |
| 5,186,731 | A | * | 2/1993 | Parker ............................. 71/5 |
| 5,192,354 | A | * | 3/1993 | Drysdale et al. .................. 71/9 |
| 5,320,807 | A |   | 6/1994 | Brinton et al. |
| 5,417,861 | A | * | 5/1995 | Burnham ..................... 210/609 |
| 5,755,852 | A | * | 5/1998 | Northrop ........................ 71/9 |
| 6,126,827 | A |   | 10/2000 | Johnson, Jr. et al. |
| 6,200,475 | B1 | * | 3/2001 | Chen ............................. 210/613 |
| 6,391,262 | B1 |   | 5/2002 | Brinton et al. |
| 6,569,332 | B2 | * | 5/2003 | Ainsworth et al. ........... 210/603 |
| 6,780,646 | B1 |   | 8/2004 | Brinton |
| 6,908,495 | B2 | * | 6/2005 | Northrop et al. ................. 71/9 |
| 7,582,467 | B2 | * | 9/2009 | Jarventie ..................... 435/267 |
| 7,964,385 | B2 | * | 6/2011 | Herlihy ....................... 435/262.5 |
| 8,007,558 | B2 | * | 8/2011 | Audet .............................. 71/6 |
| 2002/0177219 | A1 | * | 11/2002 | Olivier ....................... 435/262 |
| 2003/0059931 | A1 | * | 3/2003 | Gitt ............................ 435/290.1 |
| 2004/0048363 | A1 | * | 3/2004 | Brown et al. ............... 435/290.4 |
| 2008/0041130 | A1 | * | 2/2008 | Parent et al. ..................... 71/8 |
| 2009/0107913 | A1 | * | 4/2009 | Johnson ........................ 210/604 |
| 2009/0145188 | A1 | * | 6/2009 | Moya ............................. 71/9 |
| 2010/0024500 | A1 | * | 2/2010 | Tyler ............................. 71/6 |
| 2010/0107711 | A1 | * | 5/2010 | Sinclair ........................... 71/9 |
| 2010/0162779 | A1 | * | 7/2010 | Aviram ........................... 71/9 |
| 2010/0199734 | A1 | * | 8/2010 | Bottcher et al. ................... 71/8 |
| 2011/0247378 | A1 | * | 10/2011 | Begley et al. .................... 71/8 |

OTHER PUBLICATIONS

Brinton, et al.; "Maturity Testing for Compost End-Product Quality Classification"; Orbit Articles; vol. 2; No. 1; 7 pages, 2001.
Brinton, Jr. et al.; "Microbial Approaches to Characterization of Composting Processes"; Compost Science & Utilization; pp. 12-17; Summer 1994.
Brinton; "An International Look At Compost Standards"; BioCycle; pp. 74-76; Apr. 2001.
Whiffin et al., "Microbial Carbonate Precipitation as a Soil Improvement Technique", Geomicrobiology Journal, vol. 24, pp. 417-423, 2007.

* cited by examiner

*Primary Examiner* — Wayne Langel
(74) *Attorney, Agent, or Firm* — Brown & Michaels, PC

(57) ABSTRACT

Techniques and tools reduce pH drift downward in growth media triggered by plant growth or ammoniated fertilizers. Methods and compositions provide growing media with buffering potential to prevent pH drifts in the growing media. A compost composition has a buffering potential against pH changes. A carbonate index test provides information on a buffering potential of a compost composition. A growing medium includes a compost composition with a buffering potential to provide a stable pH that is conducive to plant growth in the growing medium.

20 Claims, No Drawings

COMPOSITIONS AND METHODS FOR BUFFERED GROWING MEDIA

BACKGROUND OF THE INVENTION

1. Field of the Invention

The invention pertains to the field of horticulture. More particularly, the invention pertains to plant growing media.

2. Description of Related Art

Growing media used in container production in greenhouses or plant nurseries mostly include peat moss, also known as moss peat or sphagnum peat, and barks, which may include both hardwood barks and softwood barks. Some media use only peat with a small amount of perlite or vermiculite. Perlite is a siliceous mineral of volcanic origin. It is produced by heating igneous rock under industrial high temperatures (1,100 to 1,600° F.) until a light powdery substance results. Lightness and uniformity make perlite very useful for increasing the aeration and drainage in a growing medium. However, perlite is dusty and has a tendency to "float" upwards in container media. It is often included in the mix solely to improve the drainage. Vermiculite is a micaceous mineral made by heating in a kiln at temperatures up to 745° C. The result is an expanded, plate-like particle with a high water-holding and mineral-holding capacity that aids in aeration, drainage, and nutrient retention in growing media. Vermiculite is considered less durable than sand or perlite, but its properties are considered generally desirable for container media. However, vermiculite has received environmental attention with regard to potential contamination with asbestos-related fibers from a related mica mineral called tremolite. Most producers monitor this issue closely to avoid problems later, and for this reason the use of vermiculite is less desirable. Other porosity agents include mostly pine bark with a small amount of peat.

Peat is the most common component in both nursery and greenhouse mixes but is increasingly in short supply as world resources of this mined product are diminishing. Much of Europe already has mandatory standards for mixes with reduced peat amounts. Peat is usually included in a growing medium mix to increase the water-holding capacity or to decrease the weight of the mix, but peat is very acidic and normally requires up to 5 to 15 pounds of limestone per cubic yard of peat mix to offset the low pH.

These conventional growing media are widely employed for small container ornamental plants, but even with augmentation of the medium with limestone, the pH of the medium may drift quite significantly over time, typically in the direction of more acidic levels. The reasons for this are believed to be the effect of the plants growing in the medium that causes among other things the uptake and loss of nutrients that help buffer pH, acidification of the medium as a result of root transpiration of organic acids, and nitrification of added chemical-ammoniated fertilizer, which causes the release of 2 moles of hydrogen for each mole of nitrogen transformed.

An additional and significant problem with peat moss is the inhibition of moisture uptake or what is called "wetting up". Water-repellant films on surfaces of the peat inherently tend to make the peat extremely hydrophobic, but if these films can be overcome, the peat itself is capable of absorbing and holding large quantities of water. Most commercial suppliers offer a product with a wetting agent, such as a surfactant, already included if it is intended for use in greenhouses and plant nurseries. If not, users are warned to perform some sort of test to see how difficult it is to wet the product before using the peat moss. If water runs off the product, then the user is instructed to purchase an agent or, if none are available at a reasonable cost, to use hot water to speed-up the wetting process. These factors dramatically increase the inconvenience and cost of using growing media containing peat moss.

The pH change of growing media may indirectly and significantly affect the quality of growth by altering color performance of pH sensitive ornamental plants and generally significantly reducing yield and quality appearance. This is very costly to the ornamental plant industry. Moreover, in the last 20 years, the move away from using soil in greenhouse and nursery container media has resulted in less buffering resistance to pH change, which has indirectly exacerbated the problem. It is not unusual that in peat and bark growing media, a decrease of up to one pH unit in a week, which is a 10-fold increase in acidity, can sometimes occur in commercial crops.

Most plants prefer to grow in relatively a relatively neutral, stable pH growth medium, and the problem of pH drift also affects other areas of horticulture. Ammonium fertilizers, which lower the pH of the soil, are commonly used in agricultural fields, and farmers typically apply lime to counteract the pH effect of the fertilizers. Lime is inexpensive but heavy, making it difficult to transport and difficult for farmers to spread. Lawn care, gardening, and golf course management are other areas where pH drift in the direction of more acidic levels can be highly detrimental to plant growth. The pH drift in the growing medium may be a result of added soil treatments, plant growth itself, acid rain, or other environmental factors.

One reason that so many plants do not survive after purchase is that the chemical controls used by the industry in the growing media leading up to the sale are temporary by nature, as they contain insufficient buffering to extend out weeks, are improperly conceived in that they only partially deal with the pH drift problem, and are reductionist in nature in that additives, typically chemicals, are used to correct a purely natural problem.

Most of the commercial container industry is trapped in this costly and highly environmentally unfriendly struggle to protect against pH and nutrient drift of container media long enough to get the plants safely to market. Additionally, many plants die or are damaged after purchase and use in landscaping by consumers, since the chemical controls employed by professionals at the place of sale are no longer operative or practicable at the home level.

Liability for improperly handled and prepared container media plants extends beyond the point of sale, as surveys show most plant nurseries offer up to a one-year replacement warranties to attract consumers and to stay in the market. This is very costly to the industry, since about 20% of buyers request replanting or restocking of pH-drifted and nutrient-damaged plants that do not satisfactorily survive the warranty period.

SUMMARY OF THE INVENTION

Techniques and tools reduce pH drift downward in growth media triggered by plant growth or ammoniated fertilizers. Methods and compositions provide growing media with buffering potential to prevent pH drifts in the growing media. A compost composition has a buffering potential against pH changes. A carbonate index test provides information on a buffering potential of a compost composition. A growing medium includes a compost composition with a buffering potential to provide a stable pH that is conducive to plant growth in the growing medium.

In one embodiment, a growing medium includes a compost composition having a predetermined level of natural free carbonate and a growth composition mixed with the compost composition. The compost composition is preferably formed by composting at least one organic material having a predetermined combined level of calcium and magnesium. The organic material preferably includes manure. The compost composition is preferably a humus composition. The compost composition and the growth composition are preferably combined in a ratio such that the growing medium has a conductivity less than about 3.5 decisiemens per meter.

In one embodiment, a method of reducing pH drift downward in a growth composition triggered by plant growth or ammoniated fertilizers in the growth composition include obtaining a compost composition having a predetermined level of natural free carbonate and combining the compost composition with the growth composition to form a growing medium having a pH buffering potential. Obtaining the composting composition preferably includes composting at least one organic material having a predetermined combined level of calcium and magnesium to form the compost composition. The organic material preferably includes manure. The method preferably includes adding exchangeable and soluble calcium to the organic material prior to composting the organic material. The method preferably includes adding exchangeable and soluble magnesium to the organic materials prior to composting the organic materials. The compost composition is preferably a humus composition.

In one embodiment, a method of quantifying a pH buffering potential of a growing medium includes adding an acid to a predetermined amount of the growing medium until no additional carbon dioxide is generated and determining an amount of carbon dioxide generated by the addition of the acid to quantify the pH buffering potential of the growing medium. The method preferably includes rating the pH buffering potential of the growing medium based on the amount of carbon dioxide generated. The growing medium preferably includes a compost composition. The compost composition preferably includes manure compost. The acid is preferably concentrated hydrochloric acid. The amount of carbon dioxide is preferably determined by a gas chromatograph.

In one embodiment, a method of testing an organic material composition for desirability of composting into a compost composition includes measuring exchangeable and soluble calcium and magnesium levels in the organic material composition, measuring a nitrogen level in the organic material composition, and determining a ratio of nitrogen to calcium plus magnesium. The method preferably includes modifying the organic material composition to reduce the ratio if the ratio is greater than or equal to one. The method preferably includes composting the organic material composition to form the compost composition if the ratio is less than one.

In one embodiment, a method of formulating an organic material composition for composting into a compost composition includes measuring exchangeable and soluble calcium and magnesium levels in a plurality of organic compositions and combining at least two of the organic compositions in a ratio based on the exchangeable and soluble calcium and magnesium levels in the organic compositions to form the organic material composition such that the organic material composition has at least a predetermined level of exchangeable and soluble calcium and magnesium. The method preferably includes composting the organic material composition to form the compost composition. A compost composition is preferably formed by the method.

In one embodiment, a method of formulating an organic material composition for composting into a compost composition includes measuring exchangeable and soluble calcium and magnesium levels in an organic composition and adding exchangeable and soluble calcium or magnesium in an amount based on the exchangeable and soluble calcium and magnesium levels in the organic composition to form the organic material composition such that the organic material composition has at least a predetermined level of exchangeable and soluble calcium and magnesium. The method preferably includes composting the organic material composition to form the compost composition. A compost composition is preferably formed by the method.

In one embodiment, a method of testing a compost composition includes measuring a level of natural free carbonate in the compost composition. The method preferably includes measuring a pH of the compost composition. The method preferably includes measuring a total alkalinity level in the compost composition. The method preferably includes measuring a total ammonium level in the compost composition. The method preferably includes measuring an ammonia level in the compost composition.

DETAILED DESCRIPTION OF THE INVENTION

In some embodiments, growing media are used in containers to sustain a living plant in a greenhouse, plant nursery, or indoor environment indefinitely, or until the living plant is transplanted to a permanent outdoor setting. In other embodiments, soil amendments are added either topically as a top dressing material or with mixing to soil, such as in agricultural fields, gardens, lawns, and golf courses. Growing media of the present invention preferably include agents to fully replace fossil-limestone, chemical nutrients, and synthetic surfactants currently being used in soils and in container growing media with peat moss, pine bark fines, and aged hardwood barks.

A growth composition, as used herein, may include hardwood barks, softwood barks including pine barks, peat, any naturally occurring soil, any naturally occurring humus, or combination thereof which supports or is capable of supporting the roots of a living plant. Compost compositions are combined with growth compositions to provide growing media, which have a pH buffering potential. Compost compositions preferably have a predetermined level of natural free carbonate. Natural free carbonate, as used herein refers to carbonate formed during the composting process and available for reacting with acid and preferably includes both calcium carbonate and magnesium carbonate.

The growing medium or soil amendment preferably includes a buffering potential compost which overcomes the above-described problems. Moreover, the buffering potential compost specifically buffers against low pH in the growing medium or soil, both in absolute terms, such as at the outset by ameliorating the initially low pH of peat and pine bark, and by episodically dynamic release of free carbonates that hold and buffer against downward pH drift of the growth medium during plant growth. The term "episodically dynamic" as used herein refers to a natural release of free carbonates "on demand" as needed to maintain pH levels. This buffering is based on medium stoichemical balance, which is a commensurate release and neutralization by carbonates supplied by the medium to meet the release of hydrogen ions by plants into the medium. When no carbonate buffering power is present in the medium, the pH drifts uncontrollably, and subsequently the plants suffer.

In some embodiments, the addition of limestone is entirely eliminated. In addition, the expensive practice of supplemental fertilization of nitrogen, phosphorus, potassium, and trace elements, such as iron, boron, copper, manganese, and zinc, is greatly reduced, and the need for chemical surfactants to offset any problems with wettability of the growing medium is eliminated.

In some embodiments, the growing medium provides moderate to enormous savings to the industry depending on the ingredients used. While limestone is the least expensive of growing medium ingredients, it is particularly heavy and dusty and does not mix well with porous fluffy media materials. Limestone is hazardous to breathe, and nursery operations mix it in such large quantities at times that a layer of white dust covers all the equipment and conveyors. The highly abrasive nature of the limestone, which is commonly used as a gritty ingredient in cleansers, makes it harmful to any equipment and power tools maintained in the area of mixing.

During the composting process, carbon dioxide is produced and released by microorganisms in the organic materials. Preferred composting compositions are capable of temporarily but stably capturing this produced carbon dioxide as a carbonate precipitation. Preferred methods of composting include composting for up to one year rather than a traditional 90 day period to assure that a humus form has been reached. Also, the compost preferably remains below a temperature of about 140° F. during the process to support microbe activity and prevent ammonia formation. These preferred conditions increase the amount of biogenic carbonate formed in the compost. The carbonate is then releasable in the growth medium to hold and buffer against downward pH drift of the growth medium during plant growth. The carbonate is preferably formed and precipitated by reaction of the carbon dioxide with a divalent or trivalent alkaline earth metal, more preferably a divalent alkaline earth metal, and most preferably calcium or magnesium. Monovalent metal ions such as sodium generally do not hold the carbonate strongly enough to precipitate, and trivalent metal ions generally hold the carbonate too strongly to release the carbonate as an effective buffer. Iron, which may be either bivalent or trivalent, forms two types of carbonate, both of which are less soluble than calcium carbonate and magnesium carbonate. A preferred compost includes both biogenic calcium carbonate and biogenic magnesium carbonate. The inclusion of magnesium provides a more wholesome growing environment in the ultimate growing medium. Such compositions may alternatively be provided by the addition of dolomite or dolomitic limestone, which contains both calcium carbonate and magnesium carbonate but is rarer than limestone and available at about three times the price.

Certain types of organic materials contain ingredients to produce composts which possess a natural pH-buffering potential. A typical example is dairy manure, which forms dairy manure compost (DMC). Dairy manure compost, although most commonly formed from cattle manure, as used herein refers to compost from manure of any ruminant animal including, but not limited to, cattle, goats, sheep, bison, deer, camels, and llamas. Domesticated ruminant animals are fed calcium supplements both to aid pH management in stomach digestion and to avoid grass tetany, a severe disease resulting from a magnesium deficiency, and the mineral-earth nature of the ruminant digestion and resulting manured-product confers the desired property to the resulting compost. Other manures for composts with a natural pH-buffering potential include, but are not limited to, chicken, horse, and pig manure.

Carbonate index tests as used herein are rapid assays to measure this pH-buffering potential. In these tests, carbonates in the growing medium are converted to gaseous carbon dioxide by the dropwise addition of acid to the medium until no additional carbon dioxide is generated. The acid is preferably hydrochloric acid, which reacts with the bound carbonates to generate carbon dioxide. The amount of generated carbon dioxide is then quantified. The tests serve to detect this otherwise unrecognized hidden lime (calcium carbonate) potential. In some embodiments, gas chromatography (GC) is used to quantify the burst of carbon dioxide from such a treated medium sample. Alternatively, the amount of carbonate may be determined by a "lime equivalent test" employing an acid-base titration reaction. Carbonate index tests have shown that a raw manure may have no carbonates prior to composting, but after three months of composting the same manure has high enough carbonate levels to make it a pH buffering potential compost.

The levels of carbonate in compost have not previously been quantified for several reasons. Prior to the present invention, no one skilled in the art thought that compost contains lime in any significant levels, and lime is not added in making compost except in rare instances. Any carbon dioxide release from composts is considered totally biogenic and induced by microbial respiration and not from inorganic carbon present in the sample.

Composts that do not contain limestone as an ingredient may nevertheless qualify as buffering potential composts. Composts to which no limestone has been added may contain sufficient pH buffering ability by nature of a carbonate index so as to qualify for this use. This is because another chemical-biological reaction is taking place, namely carbon dioxide released from microorganisms in the compost combining with exchangeable and soluble calcium and magnesium in the compost to form calcium carbonate and magnesium carbonate. In some embodiments, methods of forming compost compositions with high buffer potentials include dosing the compost or pre-compost with a small quantity of soluble, non-carbonate calcium or magnesium salts to trigger the formation of natural lime in the compost product. The salts are preferably added at a suitably early stage of the composting process to convert a low buffer potential compost composition to a high buffer potential composition. A carbonate index test may be performed to determine the amount of "doping" required for the conversion. Doping the composition early in the composting process is preferred, because more carbon dioxide is released during the early active stage of composting than the later maturing stage. Preferred doping materials include, but are not limited to, gypsum and calcium chloride, which is sometimes used as road salt. Carbonate index tests have exactly measured and determined the formation of this biogenic limestone in the compost product.

Biogenic limestone, as used herein, differs from inorganic fossil limestone in that it has recently been formed. Fossil limestone is a form of deposit up to 325 million years old dating to the Jurassic period and the Cretaceous period. The use of inorganic fossil limestone to prevent pH drift in growing media contributes to global warming by releasing fossil-bound carbon dioxide into the atmosphere. Use of composts including biogenic limestone has the additional advantage of not releasing fossil-bound carbon dioxide.

Preferred compost compositions are of the type classified as humus. The term humus, as used herein, refers to any organic material which has been completely broken down to a stable state. Immature composts contain a high level of oxygen demand in that they draw oxygen from interstitial pore space in the growing medium and trigger acid formation as the organic matter decays and are therefore not preferred for growing media additives. This counteracts the effect desired for composts with buffering potential. A preferred test system for determination of humus formation is a Solvita® respiration test system (Wood's End Laboratories, Inc., Mount Vernon, Me.), which measures head-space carbon dioxide and ammonia buildup. Alternative tests for humus formation include residual heating and measuring the ratio of ammonium to nitrate, which has a value less than one (more nitrate in parts per million than ammonium) for humus.

Information relevant to pH buffering properties in soil amendments is generally not collected when regular lab tests are performed on the soil amendments. The United States Compost Council (USCC) is a non-profit organization promoting recycling organic materials through composting. A national testing program for compost, called the USCC Seal of Testing Assurance (STA), does not collect any information pertinent to understanding pH buffering properties and only uses a 1:5 pH test of sample diluted in water. The inability to estimate in advance the pH-modifying abilities of a compost composition is a large handicap in determining its usefulness in or as a growing medium. Measured pH values alone are inaccurate indicators, since fleeting ammonia content in the medium may cause the pH to initially appear high, but with dissipation the pH will actually be found to be lower and could thus mislead one to suggest or collect the wrong sample as a pH potential compost. Thus pH testing alone may overestimate the ability of a compost to hold up against pH drift.

Carbonate index tests have determined that the carbonate index varies from compost to compost and is often quite high. In some embodiments, the test includes stepwise addition of concentrated (18N) hydrochloric acid to a compost sample. The reaction is plainly visible, as carbon dioxide effervescence is formed. A non-reactive sample receives a rating classification of "1", whereas a sample with a moderate to high reaction receives a rating classification of "2" or "3". On this scale, a rating of "2" or "3" is desirable as a compost buffering additive. A rating of "2" preferably corresponds to about a 0.5% limestone equivalent, which is also known as a calcium carbonate equivalent or a total neutralizing value and, in this case, represents the percentage of the compost by weight capable of neutralizing acid. In other words, a 0.5% limestone equivalent in a compost composition means that one pound of the compost composition is capable of neutralizing the same amount of acid as 0.05 pounds of pure calcium carbonate. Although expressed in terms of calcium carbonate, the limestone equivalent also includes carbonate in the form of magnesium carbonate in the compost composition. A rating of "3" preferably corresponds to about a 3% limestone equivalent. While on a limestone scale "high" would not necessarily assure significant liming ability, when translated into growing media blends with appreciable portions of compost, a high carbonate index can be very significant, usually increasing the pH upward initially and holding it there over time. The ability of a compost to alter and sustain a higher pH and to have a long-term, slow-control effect is referred to herein as a pH buffering potential, since it appears to be similar to properties of classical pH buffers. Unlike fossil limestone, the formed biogenic limestone is extremely fine, which makes it readily available for buffering ability. In contrast, fossil limestone must be finely ground and sieved to reach such a fine form. Carbonate index tests aid in identifying and selecting composts that have the abilities to resist pH change and therefore to convey pH buffering ability on peat and wood-bark based growing media.

By measuring and comparing pH, carbonate index, total alkalinity, total ammonium, and ammonia, the ideal buffering and nutrient supplying compost is identified. For example, any evidence of free ammonia in the sample is a sign that the pH buffering property of the sample has not settled. A desirable organic material composition for composting has low levels of components which can destroy or counteract any carbonate formed during composting. High levels of ammonia in the sample may form an acid and counteract the neutralizing ability of the carbonate. The carbonate index test is able to distinguish ammonia from carbonate, since ammonia, despite being very basic, does not produce carbon dioxide when combined with acid. A desirable organic material composition for composting preferably has low levels of nitrogen, especially in the form of ammonia, and high levels of exchangeable and soluble calcium and magnesium. The ratio of nitrogen to calcium plus magnesium is preferably less than one.

The buffering index of a compost composition is determined so that by proper use the compost augments, controls, and reduces the pH drift of growing media. The amount of buffer potential compost to be added to a growing medium is preferably determined by the level of conductivity (inverse of electrical resistance) of the buffer potential compost. A conductance that is greater than 3.5 dS/m (decisiemens per meter, equivalent to mhos per centimeter) must be diluted with a growth composition. Since compost compositions often contain levels above 10 dS/m, they must be diluted by a factor of perhaps 1:3 or slightly less with a growth composition. Therefore, a preferred pH buffering is found by the equation of conductivity versus buffering. This equation, F=(carbonate index)×5/(electrical conductivity), is preferably maximized for F to formulate a growing medium with pH buffering potential. The electrical conductivity of the growing medium gives an indication of the salinity of the growing medium. The buffering is preferably maximized without increasing the conductivity of the growth medium to levels detrimental to plant growth. The pH drift potential or modifying potential may be measured chemically or biologically. For example, a pH-sensitive ornamental plant provides a biological measurement of the effectiveness of the buffering, since the color change induced by a pH drift may be used.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A plant growing medium having a pH buffering potential and comprising:
    a) a compost composition having a predetermined level of natural free carbonate; and
    b) a growth composition mixed with the compost composition;
    wherein the predetermined level of natural free carbonate is a limestone equivalent of at least 0.5%.

2. The plant growing medium of claim 1, wherein the compost composition is formed by composting at least one organic material having a predetermined combined level of calcium and magnesium, wherein the predetermined combined level of calcium and magnesium is sufficient to form the predetermined level of natural free carbonate by the composting.

3. The plant growing medium of claim 2, wherein the organic material comprises manure.

4. The plant growing medium of claim 1, wherein the compost composition is a humus composition.

5. The plant growing medium of claim 1, wherein the compost composition and the growth composition are combined in a ratio such that the growing medium has a conductivity less than about 3.5 decisiemens per meter.

6. The plant growing medium of claim 1, wherein the predetermined level of natural free carbonate is the limestone equivalent of at least 3%.

7. A method of reducing pH drift downward in a growth composition triggered by plant growth or ammoniated fertilizers in the growth composition, the method comprising:
   a) obtaining a compost composition having a predetermined level of natural free carbonate, wherein the predetermined level of natural free carbonate is a limestone equivalent of at least 0.5%; and
   b) combining the compost composition with the growth composition to form a plant growing medium having a pH buffering potential.

8. The method of claim 7, wherein obtaining the compost composition comprises composting at least one organic material having a predetermined combined level of calcium and magnesium to form the compost composition, wherein the predetermined combined level of calcium and magnesium is sufficient to form the predetermined level of natural free carbonate by the composting.

9. The method of claim 8, wherein the organic material comprises manure.

10. The method of claim 7, wherein the compost composition is a humus composition.

11. The method of claim 7 further comprising the step of:
    c) quantifying the pH buffering potential of the plant growing medium.

12. The method of claim 11, wherein step c) further comprises the substeps of:
    adding an acid to a quantified amount of the plant growing medium until no additional carbon dioxide is generated; and
    determining an amount of carbon dioxide generated by the addition of the acid; and
    quantifying the pH buffering potential of the plant growing medium based on the quantified amount of the plant growing medium and the amount of carbon dioxide generated.

13. The method of claim 12 further comprising rating the pH buffering potential of the plant growing medium based on the amount of carbon dioxide generated.

14. The method of claim 12, wherein the acid is concentrated hydrochloric acid.

15. The method of claim 12, wherein the amount of carbon dioxide is determined by a gas chromatograph.

16. The method of claim 7, wherein the predetermined level of natural free carbonate is the limestone equivalent of at least 3%.

17. The method of claim 7, wherein the pH buffering potential prevents a pH drift downward triggered by plant growth.

18. A method of reducing pH drift downward in a growth composition triggered by plant growth or ammoniated fertilizers in the growth composition, the method comprising:
    a) obtaining a compost composition having a predetermined level of natural free carbonate, comprising:
       i) adding exchangeable and soluble calcium to at least one organic material prior to composting the organic material; and
       ii) composting the organic material having a predetermined combined level of calcium and magnesium to form the compost composition, wherein the predetermined combined level of calcium and magnesium is sufficient to form the predetermined level of natural free carbonate by the composting, wherein the predetermined level of natural free carbonate is a limestone equivalent of at least 0.5%; and
    b) combining the compost composition with the growth composition to form a plant growing medium having a pH buffering potential.

19. The method of claim 18 further comprising adding exchangeable and soluble magnesium to the organic material prior to composting the organic material.

20. The method of claim 18, wherein the organic material comprises manure and the compost composition is a humus composition.

* * * * *

UNITED STATES PATENT AND TRADEMARK OFFICE
CERTIFICATE OF CORRECTION

PATENT NO. : 8,617,280 B2  Page 1 of 1
APPLICATION NO. : 12/856211
DATED : December 31, 2013
INVENTOR(S) : William F. Brinton, Jr.

It is certified that error appears in the above-identified patent and that said Letters Patent is hereby corrected as shown below:

Title page, item (73) Assignee – lines 1-2: replace "Mount Vernon, MA (US)" with "Mount Vernon, ME (US)"

Signed and Sealed this
Fourth Day of March, 2014

Michelle K. Lee
*Deputy Director of the United States Patent and Trademark Office*